Patented May 29, 1951

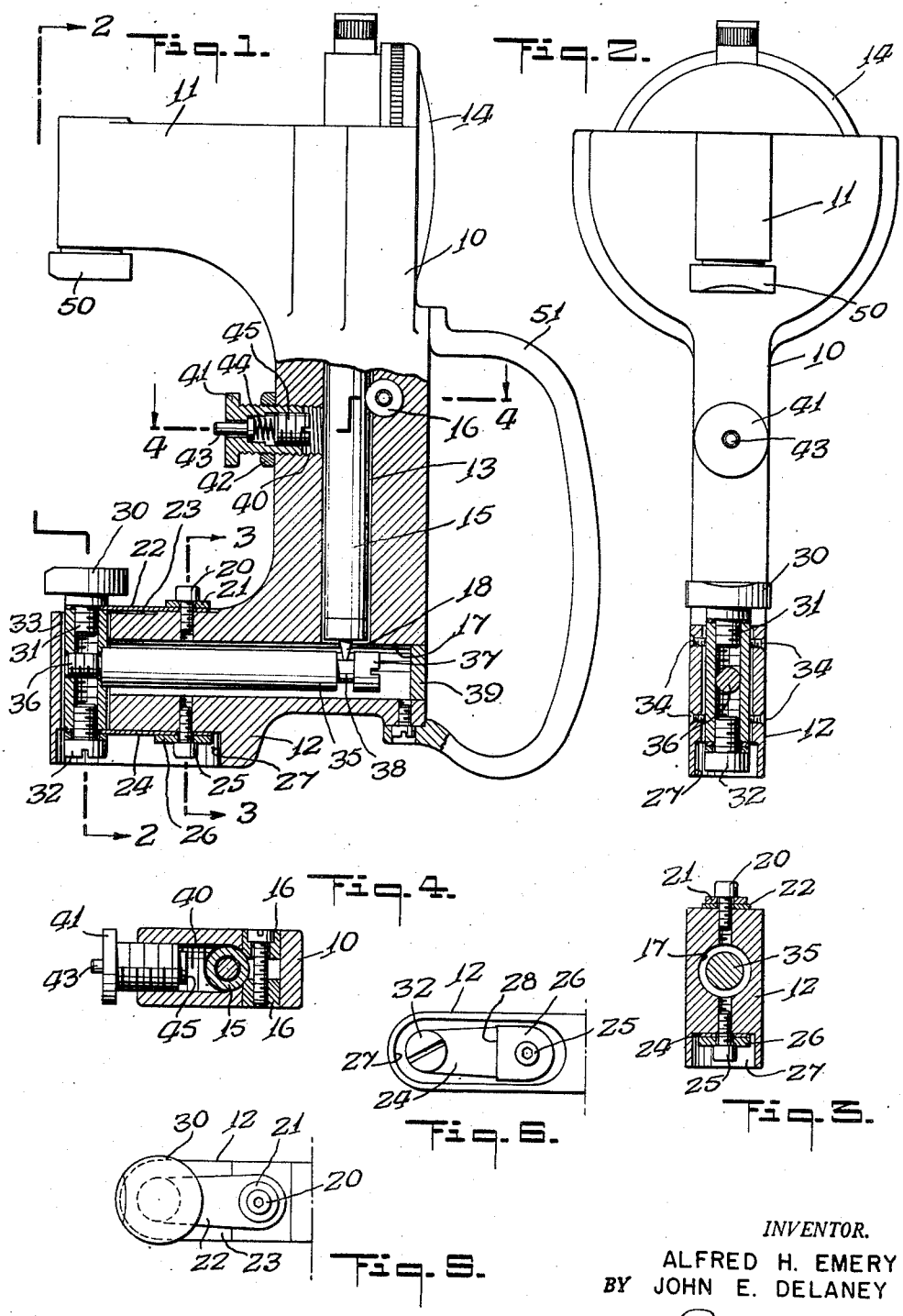

2,555,120

UNITED STATES PATENT OFFICE 2,555,120

DIAL SNAP GAUGE

Alfred H. Emery, Poughkeepsie, and John E. Delaney, Rhinebeck, N. Y., assignors to Standard Gage Company, Inc., Poughkeepsie, N. Y., a corporation of New York Application October 4, 1950, Serial No. 188,330

6 Claims. (Cl. 33—147)

The present invention relates to a dial snap gage construction, and particularly to a mode of constructing the movable anvil in such a gage in order to be certain that the flat faces of the fixed and movable anvils be at all times parallel to each other.

Great difficulty has been experienced in the past in constructing dial snap gages in such a manner as to retain the flat anvil faces at all times parallel to each other. In some instances such snap gages have been built with one of the anvils provided with a surface which is a portion of the surface of a sphere so that parallelism need not be maintained. Gages with such spherically surfaced anvils have been successful, but are not useful when it is desired to measure the diameter of the piece against a shoulder thereof.

The present invention provides flat faced anvils arranged so that the surfaces thereof are at all times parallel thereby assuring accuracy of measurement and at the same time permitting measurements to be taken close to a shoulder of a measured piece.

It is an object of the present invention to provide a dial snap gage having flat faced anvils having means to assure that the movable anvil or measuring plunger does not assume an out of parallel relationship to the fixed anvil at any time during the operation of the gage.

It is another object of the invention to provide a construction which assures movement of the movable anvil face parallel to itself, which construction is extremely simple and which does not rely upon bearings in the gage frame to assure or attempt to assure such parallel movement.

It is another object of the invention to provide a resilient means for limiting the positioning of the gage upon a workpiece to be measured in order to prevent impact blows which might damage the instrument and put it out of adjustment.

Other objects and features of the invention will be apparent when the following description is considered in connection with the annexed drawings, in which:

Figure 1 is a view of a dial snap gage incorporating my invention, the view being partially in side elevation and partially in section;

Figure 2 is a rear elevational view of the gage of Figure 1, the lower part thereof being in section, the section being taken along the plane of the line 2—2 of Figure 1;

Figure 3 is a transverse sectional view of the lower arm of the dial snap gage showing particularly the mode of fastening the supporting means for the movable anvil. This view is taken on the plane of the line 3—3 of Figure 1;

Figure 4 is a cross sectional view of the frame of the dial snap gage taken on the plane of line 4—4 of Figure 1, and showing particularly the mode of providing a resilient positioning stop;

Figure 5 is a top plan view of the movable anvil and one of its supporting reeds; and Figure 6 is a bottom plan view of the movable anvil together with the other of its supporting reeds.

Referring now to the drawing, there is shown therein a frame 10 of usual U-shaped formation having the upper arm 11 and lower arm 12. The frame 10 has a bore 13 in the base thereof and is provided with a generally semi-cylindrical cavity in the upper portion thereof whereby a dial indicator 14 (Figures 1 and 2), having an elongated measuring plunger housing 15, may be mounted in the cavity with the plunger housing extending freely through the bore. The indicator 14 is clamped in position in the frame 10 by means of the usual clamping screw and washer arrangement 16.

In accordance with our invention, a bore 17 is provided in the lower arm 12 of the frame 10, this bore extending at right angles to the bore 13 and being so placed that the measuring plunger 18 of the dial gage 14 extends into the bore.

Mounted on the upper side of the extremity 12 by means of a screw 20 and cooperating washer 21 is a reed 22 which reed is free to move downwardly, flexing about the edge of a depressed portion 23 of the arm 12. A second reed 24 is similarly mounted, through the use of a screw 25 and cooperating washer 26, in a cavity 27 formed in the lower portion of the arm 12. Reed 24 is free to flex downwardly about the square end 28 of the washer 26. It will be seen that the end 28 of washer 26 lies directly under the edge of the depressed portion 23 of the upper surface of arm 12 so that the reeds 22 and 23 have the same unsupported length and are supported at points lying in the same vertical plane.

The movable anvil or measuring plunger 30 is supported by the reeds 22 and 24 being fastened thereto in a manner about to be described.

Shank 31 of movable anvil 30 is drilled and tapped longitudinally thereof throughout its length and the measuring anvil 30 is provided with a threaded portion of reduced diameter which threads into the shank 31 passing through a hole in the reed 22. In like manner a screw 32 is passed through a hole in reed 24 and is screwed into the bottom portion of the shank 31. Shank 31 has a clearance fit in the bore 33 which extends vertically through the outer extremity of arm 12. Thus it will be seen that the measuring anvil 30 may move in a generally vertical direction as the reeds 22 and 24 are flexed. There is, of course, a small arc of movement but this is so small as to be negligible. Due to the reed support as stated, it will be clear that the face of the anvil 30 always is parallel to its original position no matter what movement has been caused by the measured piece and is parallel in so far as tipping from left to right in the plane of the paper. However, it is entirely possible with this reed construction for the anvil to tip forward and backward with respect to the plane of the paper.

In order to preclude this possibility, four screws designated 34, Figure 2, are provided. These screws are threaded into the sides of the arm 12 adjacent the top and bottom thereof and bear against the shank 31 of the movable anvil 30. They are adjusted so that they prevent any tipping movement of the anvil while permitting the vertical reciprocating movement which is desired and necessary.

In order to transmit the movement of the movable anvil 30 to the measuring plunger 18 of the gage 14, a cylindrical rod 35 having a reduced threaded portion 36, is rigidly fixed to the shank 31 of the anvil 30. This is accomplished by threading the reduced end 36 of the rod 35 into a tapped hole in the shank 31, this hole extending at right angles to the tapped hole in which the anvil 30 and screw 32 are threaded.

As will be obvious from Figure 1, the rod 35 is provided with a slotted end 37 whereby it may be screwed into the shank 31, an opening being provided in the frame 10 for this purpose. The wedge shaped tip of plunger 18 seats in a groove 38 adjacent the end of rod 35 whereby movement is transmitted to the plunger. The opening mentioned is provided with a plug 39 which may be inserted after the rod is in its position.

On the interior face of the central portion of the U-shaped frame 10 a hole is bored as indicated at 40. In this hole there is screwed a cylindrical sleeve 41, the outer surface of which forms a stop for properly locating the gage upon a piece to be measured, the sleeve being locked in adjusted position by means of a lock-nut 42.

The sleeve 41 has a central aperture therein in which is located a plunger 43, which plunger has an enlarged head in order to retain it within the sleeve 41. Bearing against the enlarged head of plunger 43 is a spring 44, which spring is compressed to a desired extent by means of a screw 45 threaded into the interior of an enlarged bore in the sleeve 41.

It will be clear from the description just given that the spring 44 may be compressed to a desired extent in order to impart a particular degree of resiliency of movement to the plunger 43 and that the sleeve 41 may be adjusted by threading it into the bore of the frame 10 to a desired extent. Thus, if the gage is placed with a rapid movement upon a piece to be measured, the spring 44 will absorb any impact which might otherwise result and will serve to protect the gage from shock while at the same time the surface of the sleeve 41 will determine the position of the gage upon the workpiece.

It should be mentioned at this time that the upper anvil 50 is rigidly supported in any desired manner in the upper arm 11 of the frame 10 and cooperates with the lower anvil 30 in the usual manner. It will also be noted that the anvils 30 and 50 are provided with a slight bevel at the leading edges in order to facilitate the placing of the gage upon a piece to be measured. It will likewise be noted that the gage is provided with the usual handle 51 although it may, of course, be mounted in a fixture in the event that the gage is to be used for checking and the piece is brought to the gage rather than the gage placed on the work.

While we have described a preferred form of the invention, it will be understood that many modifications may be made within the scope of the invention. We wish, therefore, to be limited not by the foregoing description, but on the contrary, solely by the claims granted to us.

What is claimed is:

1. A movable anvil structure for a dial snap gage of the type having a U-shaped frame, a fixed anvil mounted in one of the arms of the frame and an opposing movable anvil mounted in the other arm of said frame, comprising in combination, a movable anvil having a shank, a bore in one arm of said frame forming a clearance mounting for said anvil shank, a pair of reeds fixed to said anvil shank and anchored to the gage frame adjacent the opposite ends of said bore, said reeds mounting said anvil for limited substantially reciprocatory movement in said bore, said reed mounting preventing tipping of said anvil and shank in the plane of the U-shaped frame and a pair of screw members extending through said frame into said bore and in contact with said anvil for preventing tipping movement of said anvil shank with respect to the plane of said gage frame.

2. A movable anvil structure for a dial snap gage of the type having a U-shaped frame, a fixed anvil mounted in one of the arms of the frame and an opposing movable anvil mounted in the other arm of said frame, comprising in combination, a movable anvil, a shank for said anvil comprising an internally threaded cylindrical sleeve, a bore in said arm in which said anvil shank reciprocates being a clearance fit in said bore, a reed mounted on each edge of the frame arm at points spaced from said bore, said anvil passing through said reed on the side of said frame facing the fixed anvil and being threaded into said shank, said threaded connection clamping said reed to said anvil and shank member, a screw threaded into the opposite end of said shank, said screw passing through said second reed to clamp said second reed to said shank whereby said reeds form a flexible mounting for said anvil and shank permitting substantially reciprocatory movement of said anvil and cylindrical shank while retaining the gaging faces of the anvil in a plane parallel to the face of the fixed anvil, said reed mounting preventing tipping of said anvil and cylindrical shank in the plane of the gage frame, and means comprising pins extending through said gage frame arm into contact with said cylindrical anvil shank, said pins preventing tipping of said anvil and cylindrical shank with respect to the plane of the gage frame.

3. In a dial snap gage of the type having a U-shaped frame and a fixed anvil mounted in one of the arms thereof, in combination, a bore extending longitudinally of the base of the U-shaped frame of the gage, a dial indicator mounted on the frame with an elongated portion of the plunger housing extending into said frame bore, a second bore in said frame extending generally perpendicularly to said first-mentioned bore and into the arm of the U-shaped frame opposite to the arm supporting the fixed anvil, a third bore in the last-mentioned frame arm, intersecting said second bore and extending substantially parallel to said first bore, a movable anvil reciprocable in said third bore, said movable anvil being located on the center line of the fixed anvil whereby said anvils cooperate to measure a piece inserted therebetween, a pair of reeds supporting said movable anvil, said reeds being fixed to one arm of the U-shaped frame and to the shank of said movable anvil to thereby support said movable anvil for substantially reciprocatory movement in said third bore, said anvil shank being a clearance fit in said third bore, and a member fixed to said shank of said movable anvil and extending at right angles to said shank into said second-mentioned bore, the extremity of said member opposite said anvil shank bearing against the measuring plunger of the dial indicator in order to transfer movement from said movable anvil to the operating mechanism of the indicator.

4. In a dial snap gage of the type having a U-shaped frame and a fixed anvil mounted in one of the arms thereof, in combination, a bore extending longitudinally of the base of the U-shaped frame of the gage, a dial indicator mounted on the frame with an elongated portion of the plunger housing extending into said frame bore, a second bore in said frame extending generally perpendicularly to said first-mentioned bore and into the arm of the U-shaped frame opposite to the arm supporting the fixed anvil, a third bore in the last-mentioned frame arm intersecting said second bore and extending substantially parallel to said first bore, a movable anvil reciprocable in said third bore, said movable anvil being located on the center line of said fixed anvil whereby said anvils cooperate to measure a piece inserted therebetween, a pair of reeds supporting said movable anvil, said reeds being fixed to one arm of the U-shaped frame and to the shank of said movable anvil to thereby support said movable anvil for substantially reciprocatory movement in said third bore, said anvil shank being a clearance fit in said third bore, a member fixed to said shank of said movable anvil and extending at right angles to said shank into said second-mentioned bore, the extremity of said member opposite said anvil shank bearing against the measuring plunger of the dial indicator in order to transfer movement from said movable anvil to the operating mechanism of the indicator, and two pairs of screw members extending through the extremity of that arm of the frame in which the movable anvil reciprocates and into contact with the anvil shank, said screws serving to prevent tipping of the anvil shank from a plane parallel to the plane of the U-shaped frame, said reed mounting of said movable anvil serving to prevent tipping of said anvil in the vertical plane of the frame whereby the face of said movable anvil is at all times parallel to the face of the fixed anvil.

5. In a dial snap gage of the type having a U-shaped frame and a fixed anvil mounted in one of the arms thereof, in combination, a bore extending longitudinally of the base of the U-shaped frame of the gage, a dial indicator mounted on the frame with an elongated portion of the plunger housing extending into said frame bore, a second bore in said frame extending generally perpendicularly to said first-mentioned bore and into the arm of the U-shaped frame opposite to the arm supporting the fixed anvil, a third bore in the last mentioned frame arm, said third bore intersecting said second bore and extending substantially parallel to said first bore, a movable anvil having a shank reciprocable in said third bore, said movable anvil shank being located on the center line of the fixed anvil whereby said anvils cooperate to measure a piece inserted therebetween, a pair of reeds supporting said movable anvil, said reeds being fixed to one arm of the U-shaped frame and to the shank of said movable anvil to thereby support said movable anvil for substantially reciprocatory movement in said third bore, said anvil shank being a clearance fit in said third bore, and a resilient limiting stop mounted centrally of the base of the U-shaped gage frame, said resilient limiting stop comprising a cylindrical sleeve, a shouldered plunger extending through a small central bore in said sleeve, a resilient member mounted in an enlarged portion of the bore in said sleeve, a screw mounted in said enlarged bore portion and compressing said spring against the head of said plunger, and means for adjustably mounting said resiliently pressed plunger and sleeve in the gage frame, said means comprising a tapped hole in said frame and external threads on said sleeve whereby the face of said sleeve forms a definite stop for work inserted between said anvils and said plunger resists movement toward said stop of a piece to be measured to cushion the impact of the piece against the stop.

6. A stop for positioning pieces to be measured in a dial snap gage of the type having a U-shaped frame, a movable anvil in one arm of the said frame and a fixed anvil in the opposing arm thereof, said stop comprising, in combination, a cylindrical sleeve, a shouldered plunger extending through a small central bore in said sleeve, a resilient member mounted in an enlarged portion of the bore in said sleeve, a screw mounted in said enlarged bore portion and compressing said spring against the head of said plunger, and means for adjustably mounting said resiliently pressed plunger and sleeve in the gage frame, said means comprising a tapped hole in said frame and external threads on said sleeve whereby the circular face of said sleeve forms a definite stop for work inserted between said anvils and said plunger resists movement toward said stop of a piece to be measured to cushion the impact of the piece against the stop.

ALFRED H. EMERY.
JOHN E. DELANEY.

No references cited.